Oct. 22, 1940.    M. F. JUDD    2,218,535
FRICTION FACING AND METHOD OF MAKING SAME
Filed Sept. 20, 1937    2 Sheets-Sheet 1
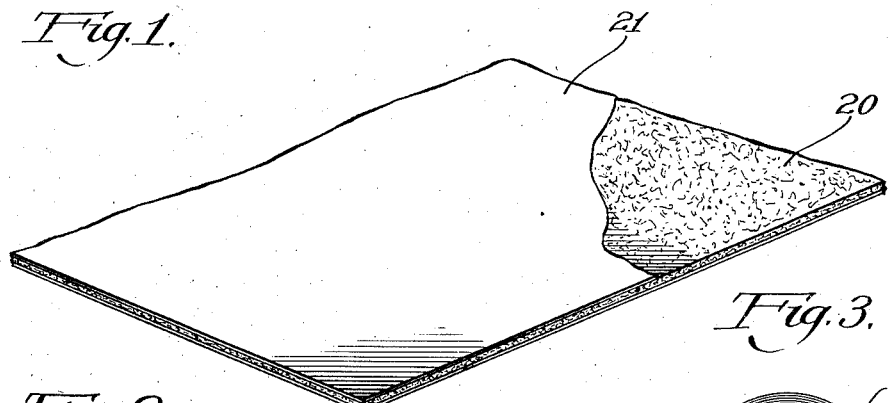
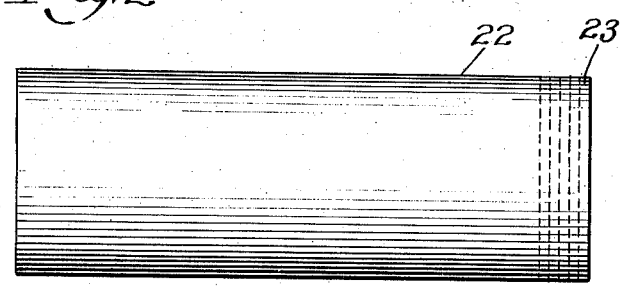
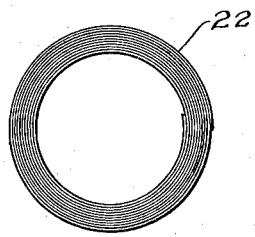
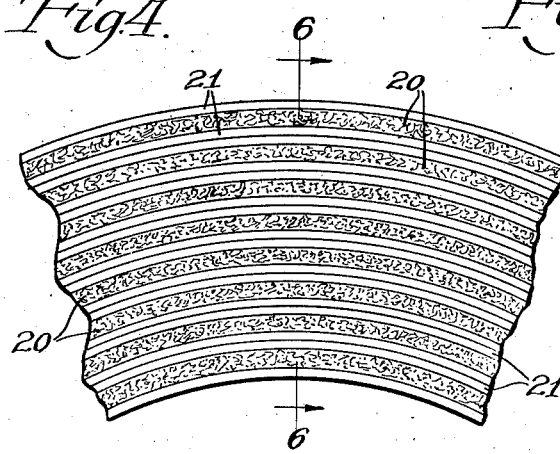
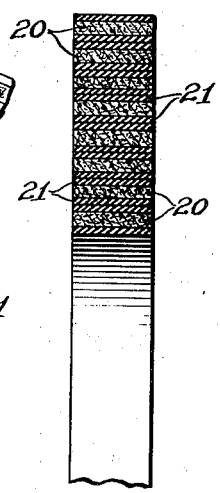
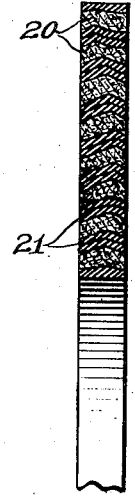
Inventor:
Morton F. Judd
By Lee J. Gary
Attorney

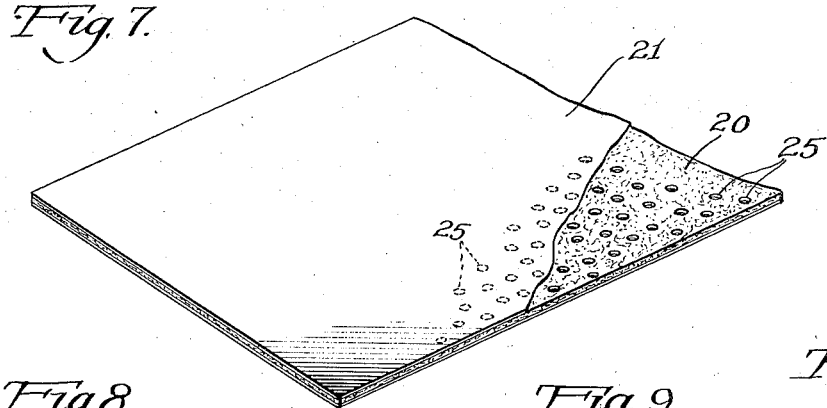
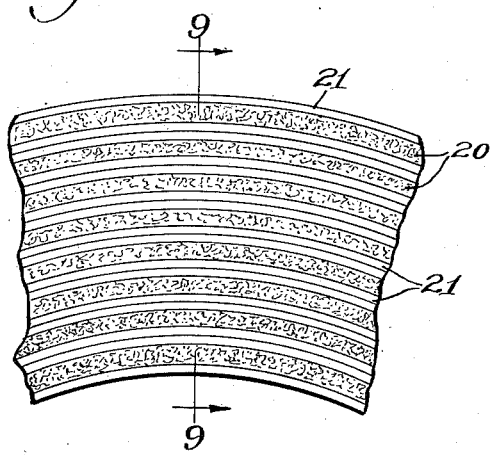
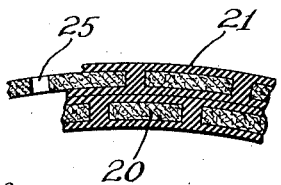
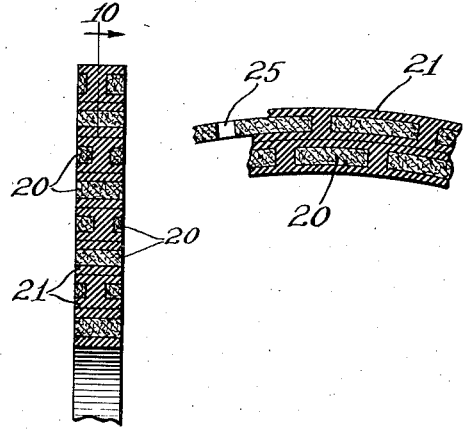
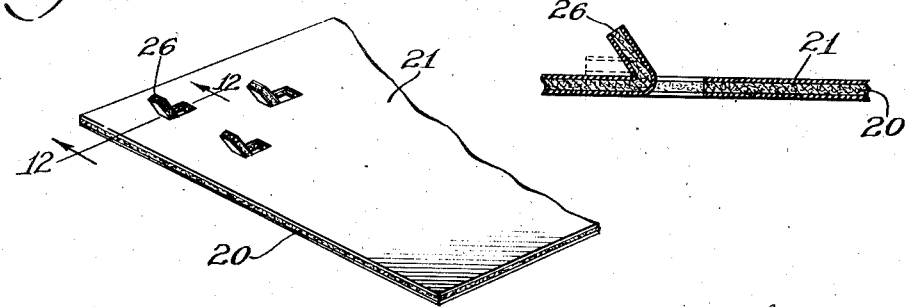
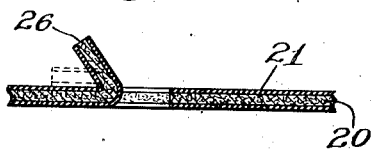

Patented Oct. 22, 1940

2,218,535

UNITED STATES PATENT OFFICE 2,218,535

FRICTION FACING AND METHOD OF MAKING SAME

Morton F. Judd, Stratford, Conn., assignor to Raybestos-Manhattan, Inc., Passaic, N. J., a corporation of New Jersey Application September 20, 1937, Serial No. 164,754

10 Claims. (Cl. 154—2)

This invention relates to a new and improved friction material and method of making the same, and has for its particular object the formation of a convoluted, bonded structure, in annular form suitable for use as a clutch facing. Specifically, the improved friction material comprises alternate thin layers of a heat-resisting or heat-indestructible sheeted fibrous base and a compound of filler in a gelled binder, the layers being perpendicular to the wearing face of the clutch facing.

Other objects relate to the production of a product which has excellent friction properties in respect to durability, has the coefficient of friction and smoothness of action which are highly desirable and essential in present day clutch facings subjected to high speed operation, and a process for producing the same which is cheaper and more controllable than previous methods of producing the structure of the same or similar type.

Friction elements of convoluted structure have previously been proposed and made, although the methods heretofore proposed have been subject to serious limitations and others have been economically impractical due to their excessive cost. Previously asbestos yarn, asbestos cloth and asbestos paper have been wound into tube form and, after saturation with a binder and subsequent hardening of the binder, have been sliced into rings to form friction elements. Because of the necessity for saturation of the resultant thick mass, the utilization of binders of the gummy type, which have been demonstrated to be the most satisfactory for present day friction materials, has been seriously limited or precluded. And further, because it has been found that for certain uses requiring a high coefficient of friction with smooth action, it is undesirable to saturate the asbestos itself.

The art also shows pre-coating of yarn and narrow asbestos tape with rubber compounds, and winding the same to form a convoluted structure for friction material. This requires the use of asbestos yarns or expensive cloth costing four to eight times as much as the sheeted base used in the process of this invention and it is therefore highly uneconomical, in contrast therewith. Further, because of the necessity for using costly long asbestos fiber in addition to excessive labor and wastage attendant upon conversion of this fiber into yarn or cloth, the method and structure is also an economic waste compared with the present invention.

Other objects and advantages of my invention will appear from the accompanying drawings and following description wherein—

Fig. 1 is a perspective view with parts broken away, showing a sheeted fibrous base coated with a binder.

Fig. 2 is a side view of a coated sheeted base spirally wound in the form of a tube.

Fig. 3 is an end view thereof showing the convolutions of the spirally wound sheet.

Fig. 4 is a fragmentary view of a face of the clutch facing after compression and cure.

Fig. 5 is a partial section of a clutch ring after winding but before compression and cure.

Fig. 6 is a partial section of a ring after compression and cure, taken on the line 6—6, of Fig. 4.

Fig. 7 is a perspective view with parts broken away, of a modified coated sheet structure showing perforations extending through the coated sheet.

Fig. 8 is a fragmentary face view of a clutch facing after compression and cure formed of windings made from a sheet having perforations as in Fig. 7 or Fig. 11.

Fig. 9 is a section on the line 9—9 of Fig. 8.

Fig. 10 is a section on the line 10—10 of Fig. 9.

Fig. 11 is a fragmentary perspective view of a coated sheet having openings struck out therefrom by regulated tearing means.

Fig. 12 is a section at the line 12—12 of Fig. 11, showing a tongue which has been forced outwardly and which may be retained and compressed against the sheet surface.

It will be understood that the figures of the drawings are diagrammatic and highly exaggerated for the purpose of clarity and a better understanding of my invention. For example, the number of thicknesses of sheeted fibrous base in Figs. 3, 4, 5, 6, 8, 9 and 10 may comprise one hundred more or less thicknesses. Also the perforations in the sheeted fibrous base as shown in Figs. 7 and 11, and particularly as shown in Figs. 9, 10 and 12, are greatly enlarged for the purpose of more thoroughly explaining my invention, and are to be considered diagrammatic only.

Referring to the drawings, 20 refers to a heat-resisting or heat-indestructible sheeted fibrous base, coated as illustrated at 21 with a heat hardenable binder having adhesive properties. The following may be a typical coating solution for a gasoline cement:

| | Percent by volume |
|---|---|
| Gasoline, 3 parts | Smoked sheet 25 |
| | Barytes 50 |
| Rubber compound, 4 parts → | Litharge 8 |
| | Graphite 7 |
| | Sulphur 9 |
| | D. P. G. (diphenyl-guanidine) 1 |

This coating may be applied on a conventional spreader or by passing the sheet through a bath of the cement solution in which case a suitable doctor blade may be used to control the amount of the coating applied to the sheet. The amount of coating applied is such that, when the coating is dried or the solvent has been evaporated, the ratio of the binder compound to fibrous base by weight should be approximately 60 to 40.

After the fibrous base has been coated it may pass from the coating machine or coating means to a conventional tube winding machine where it is spirally wound into the form of a tube 22 as shown by Figs. 2 and 3. The tube winding machine should have a mandrel of slightly greater diameter than that of the inner diameter of the clutch facing after it has been compressed and cured, and the tube is wound up to a diameter slightly under that of the outside diameter required in the finished facing after the ring has been compressed and cured so as to permit ease in handling in subjecting it to mold vulcanization. The coated base having adhesive properties due to the binder present forms a tightly wound and bonded structure for the next operation which is that of slicing off single blanks of annular ring shape as at 23. This may be carried out on a conventional roll slicing machine of the type similar to that used for textiles. Instead of forming an elongated tube and slicing off single blanks therefrom, the entire width of the coated paper as it comes from the coating operation may be cut into narrow strips by passing it through a suitable device such as a Cameron slitter and each strip may be individually wound into a single roll or ring of a width or thickness suitable for introduction to the mold as shown in Fig. 5.

The annular blanks of a thickness regulated by the amount of distortion and compression to be obtained are placed in suitable molds and cured under heat and pressure. The compression is ordinarily about 40%. The rubber compound flows and fills all the interstices, and the paper is forced to take on a greater thickness and density or otherwise change its cross sectional shape. The resulting structure on removal from the mold is then further heat treated to improve frictional characteristics and machined to size. By varying the cross sectional shape of the blank with respect to that of the mold, I obtain various types and degrees of distortion within the pressed facing, which distortions tend to lock the plies of asbestos together.

Where greater centrifugal strength is required, before winding up the coated sheet, I perforate it with a regular or irregular design of small openings 25 as shown in Fig. 7, so that when pressed together the binder 21 will pass through the openings 25 in the paper 20 and key the layers together as shown in Figs. 9 and 10. The perforation may be accomplished either by the use of punching dies which remove a portion of the sheet, as shown in Fig. 7, or by a regulated tearing such as is produced by passing the sheet between sharp toothed gears to force out tongues of stock 26, as shown in Fig. 11 in similar fashion to the perforation of thin metal for various purposes. The tongues may be laid back as in Fig. 12 by suitable means to leave the desired holes in the paper. The papers may again be coated with compound and fill the holes to connect the compound throughout the mass. In a continuous operation the paper may be coated, dried, perforated between sharp gears, run through the Cameron cutter to slit the sheet, followed by winding into blanks for pressing.

The paper used may be an asbestos base material containing a minimum of cellulose fibre. It may, if desired, be strengthened by the introduction of sizing or binding materials, such as starch, glue, natural or synthetic resins, latex or synthetic rubber, either by beater methods or wet web or dry web saturation methods. Other modifying ingredients such as inorganic, organic or metallic fillers and solid asphalts and the like may be introduced into the paper by known methods to vary the strength or frictional properties of the finished product.

I may also introduce strips of copper, brass, lead, tin or zinc foil or strands of wire between the convolutions of the sheeted material while it is being spirally wound, either continuously, or at spaced intervals so as to provide one or more convolutions of metallic foil or wire to act as a stiffener or reinforcement.

The use of these metallic inserts also serves to modify the friction characteristics of the completed friction element. The metallic surface against which the friction element is engaged is usually formed of cast iron and bears tool marks on its surface, which marks abrade or score the friction facing at each engagement or application. By means of the heat developed by operation and engagement of the friction element, its metallic inserts or layers tend to liquefy at their exposed edges and form a thin metallic film which fills out the irregularities of the metallic engaging surface and thereby protects the surface of the friction element and improves its friction characteristics.

I have described the use of a rubber-filled compound as the interstitial binder for the convolutions of paper, but I may also use other gel-forming binders having similar functions to rubber in making this new product, e. g., synthetic or halogenated rubbers, gummy synthetic resins of the type which become infusible or gelled on heating, highly oxidized vegetable oils and bitumens and the like, compounded with suitable fillers for friction material use. It will be appreciated that hardness, gumminess, heat resistance, density and abrasiveness of the compound used as interstitial binder will affect the frictional properties of the product and I may use any of the above materials singly or in combination to obtain the specific results desired within the scope of this invention.

I claim as my invention:

1. A convoluted bonded compressed structure in annular form for use as a clutch facing comprising alternate thin layers of foraminated heat resisting felted asbestos base sheet material, and a compound of hardened rubber cement binder comprising fillers, the layers being perpendicular to the wearing face of the clutch facing.

2. A friction element suitable for a clutch facing comprising an annular body formed of thin layers of perforated asbestos base paper coated with a binder capable of being hardened and rendered infusible comprising fillers, the said binder being hardened in situ.

3. A convolutely wound friction element suitable for a clutch facing comprising an annular body formed of thin layers of perforated heat resisting felted asbestos base sheet material and interstitial binder capable of being hardened and rendered infusible comprising fillers, the said element being laterally compressed and radially expanded, and the said binder being interlocked with said fibrous material and hardened in situ.

4. A convolutely wound, bonded, compressed, radially distended structure suitable as a clutch facing comprising alternate thin layers of felted fibrous asbestos base material having openings therein formed by regulated tearing means and a compound of heat cured infusible binder comprising fillers penetrating said fibrous sheets, the layers being perpendicular to the wearing face of the clutch facing.

5. The method of forming a convoluted structure in annular form suitable as a clutch facing and comprising alternate layers of a heat resisting asbestos base paper and a compound of hardened binder comprising fillers, the layers being perpendicular to the wearing face of the clutch facing, which comprises coating a sheet of heat resisting asbestos base paper with a gummy binder compound capable of being hardened and rendered infusible, drying the binder, foraminating the sheet and spirally winding it in the form of a tube, separating said tube into individual annular elements, and subjecting said elements to compression and heat to cure said binder and to interlock it into the fibres and foraminations thereof.

6. The method of forming a convoluted structure in annular form suitable as a clutch facing and comprising alternate layers of a heat resisting asbestos base paper and a compound of hardened binder comprising fillers, the layers being perpendicular to the wearing face of the clutch facing, which comprises coating a sheet of heat resisting asbestos base paper with a gummy binder compound capable of being hardened and rendered infusible, drying the binder, foraminating the sheet and slitting it longitudinally into tapes, spirally winding said tapes in the form of annular rings, and subjecting said rings to heat and pressure in molds to flow and cure said binder and to bond and interlock the layers of said tape.

7. The method of forming a convoluted structure in annular form suitable as a clutch facing and comprising alternate layers of a heat resisting asbestos base paper and a compound of hardened binder, the layers being perpendicular to the wearing face of the clutch facing, which comprises coating asbestos base paper with a gummy binder compound capable of being hardened and rendered infusible, drying the binder, foraminating the paper and spirally winding it to form individual tightly wound and bonded annular elements therefrom, subjecting said elements to compression and heat to flow and cure said binder, and to bond and interlock the layers thereof.

8. A friction element suitable for use as a clutch facing comprising an annular body in the form of a spirally wound felted asbestos base sheet having a thin layer of a hardened cementitious binder, including mineral fillers and metallic strip material inserts, interposed between adjacent sheet convolutions, the said layer being exposed to the operative surfaces of said element and extending therebetween in a substantially uniform thickness.

9. A convoluted bonded compressed structure in annular form for use as a clutch facing comprising essentially thin layers of felted asbestos base sheet material, a compound of hardened cementitious binder comprising fillers, and metallic strip material, the layers being perpendicular to the wearing face of the clutch facing and exposed thereto.

10. A convoluted, bonded, compressed, and radially expanded structure in annular form for use as a clutch facing comprising essentially alternate thin layers of a heat resisting asbestos base paper, and a compound of heat cured adhesive binder comprising fillers, the said structure having wound therewith and embedded in the said binder layer metallic strip material, the layers being perpendicular to the wearing face of said clutch facing and each of said component materials being exposed to said face.

MORTON F. JUDD.